US008078434B2

(12) United States Patent
Yelchuru et al.

(10) Patent No.: US 8,078,434 B2
(45) Date of Patent: Dec. 13, 2011

(54) SYSTEMS AND METHODS FOR OFFLINE AND/OR ONLINE BATCH MONITORING USING DECOMPOSITION AND SIGNAL APPROXIMATION APPROACHES

(75) Inventors: Ramprasad Yelchuru, Bangalore (IN); Srikanth Ryali, Bangalore (IN); Shailesh Rajnikant Patel, Gujarat (IN); Gudi Ravindra, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 664 days.

(21) Appl. No.: 12/174,955

(22) Filed: Jul. 17, 2008

(65) Prior Publication Data

US 2010/0017008 A1    Jan. 21, 2010

(51) Int. Cl.
    *G06F 7/60* (2006.01)
    *G06F 17/10* (2006.01)
(52) U.S. Cl. ............................................. 703/2; 702/81
(58) Field of Classification Search ......... 703/2; 702/81
    See application file for complete search history.

(56) References Cited

U.S. PATENT DOCUMENTS 7,010,364 B1    3/2006    Singh et al.

FOREIGN PATENT DOCUMENTS

| KR | 200100616622 | 7/2001 |
|---|---|---|
| WO | WO03107102 | 12/2003 |

OTHER PUBLICATIONS

MacGregor et al. "Statistical Process Control of Multivariate Processes" Elsevier 1995.*
Kano et al. "Comparison of multivariate statistical process monitoring methods with applications to the Eastman challenge problem" Elsevier 2002.*
McMaster Advanced Control Consortium; http://macc.mcmaster.ca/research/keywords.htm.
Model-Based Multiscale Performance Monitoring for Batch Process; Ming Guo, Lei Xie, Shu-Qing Wang; IEEE Int, Conf. Neural Networks & Signal Processing Nanjing, China, 14-17, 2003.
A Wavelet-Based Adaptive MSPCA for Process Signal Monitoring & Diagnosis; Zhiqiang Geng and Qunxiong Zhu; Proceedings of 2204 International Conferences on Information Acquisition.

(Continued)

*Primary Examiner* — Saif Alhija
(74) *Attorney, Agent, or Firm* — Jetter & Associates, P.A.

(57) ABSTRACT

A method (300, 400, 500, 1200) for offline/online monitoring of batch processes. The method involves (312) decomposing a time domain of a batch process run (BPR) into several blocks and (334) building multivariate statistical models (MSMs) for each of them using archived data for a batch process (ABPD). ABPD comprises stored data obtained during BPRs. The method also involves (506, 1204) retrieving recently stored data (RSD) for a recent fully performed BPR run ($FPR_{NEW}$) or current BPR run. The method further involves (520, 1210) building a feature vector matrix (FVM) using RSD. FVM contains feature vectors representing statistical measures of wavelet coefficients determined for variables ($v_0, \ldots, v_J$). A projection (1100, 1150, 1190) is formed by projecting feature vectors onto at least one MSM or a combined multivariate statistical model (CMSM). CMSM is a weighted average of at least two MSMs. Subsequently, at least one estimate is generated for $FPR_{NEW}$ or current BPR run using information provided by the projection (528, 1220).

24 Claims, 15 Drawing Sheets

OTHER PUBLICATIONS

On-Line Dynamic Process Monitoring Using Wavelet-Based Generic Dissimilarity Measure; S.I. Alabi; A.J. Morris and E.B. Martin; 2005 Institution of Chemical Engineers, Trans IChemE, Part A, Jun. 2005.

Yelchuru, et al. (2008) "Prediction of Batch Quality Indices Using Functional Space Approximation and Partial Least Squares" 2008 American Control Conference, Seattle, Washington, USA, Jun. 11-13, 2008.

Yoo, et al. (2004) "On-line Monitoring of Batch Processes Using Multiway Independent Component Analysis" Elsevier Chemometrics and Intelligent Laboratory Systems 71 (2004) 151-163.

Nomikos et al. (1995) "Multivariate SPC Charts for Monitoring Batch Processes" Department of Chemical Engineering, McMaster University, Hamilton, Ontario, Canada, 1995 American Statistical Association and the American Society for Quality Control.

\* cited by examiner $$[\mathbf{x}]_{\text{I} \cdot \text{JT}} = \begin{vmatrix} \overbrace{v_0, \ldots, v_J}^{T_0} & \overbrace{v_0, \ldots, v_J}^{T_1} & \cdots & \overbrace{v_0, \ldots, v_J}^{T_{t-1}} & \overbrace{v_0, \ldots, v_J}^{T_t} & & \text{FPS}_0 \\ \overbrace{v_0, \ldots, v_J}^{T_0} & \overbrace{v_0, \ldots, v_J}^{T_1} & \cdots & \overbrace{v_0, \ldots, v_J}^{T_{n-2}} & \overbrace{v_0, \ldots, v_J}^{T_{n-1}} & \overbrace{v_0, \ldots, v_J}^{T_n} & \text{FPS}_1 \\ \vdots & & & & & & \vdots \\ \overbrace{v_0, \ldots, v_J}^{T_0} & \overbrace{v_0, \ldots, v_J}^{T_1} & \cdots & \overbrace{v_0, \ldots, v_J}^{T_t} & & & \text{FPS}_N \end{vmatrix}$$

FIG. 7

SYSTEMS AND METHODS FOR OFFLINE AND/OR ONLINE BATCH MONITORING USING DECOMPOSITION AND SIGNAL APPROXIMATION APPROACHES

FIELD OF THE INVENTION

The invention concerns industrial batch processing systems and methods for offline and/or online batch monitoring using wavelet based statistical measure features (e.g., wavelet based variance features).

BACKGROUND

Batch processes are used in industrial processes for a variety of industries (e.g., the food and chemical industries). A "batch process", as used herein, refers to a process that runs for a finite (but variable) duration to produce a batch of product at the end of the duration. The antithesis of a batch process is a continuous process, such as a continuous processes based on a distillation column. Batch processes are often used in industrial processes for manufacturing batches of specialty products with high added value. Such specialty products include, but are not limited to, pharmaceuticals, resins, and composites. Batch processes are also typically used in industrial processes for producing batches of food. Online monitoring of such batch processes is important for safe production of high quality products. Such monitoring approaches are also important to enhance the production efficiencies so that a consistent set of high quality batches are produced.

The inherent time varying nature of batch processes results in a variation of batch conditions throughout the performance of the batch process. The phrase "batch condition", as used herein, refers to the state (or health) of the product being manufactured during a batch process. The state (or health) of a batch of product can generally be defined in terms of normalcy. For example, a batch condition can indicate a healthy batch of product (i.e., a normal batch of product) or an unhealthy batch of product (i.e., an abnormal batch of product).

There are several methods known in the art for online monitoring of batch processes. Conventional methods generally involve assessing a batch condition at a particular time during the performance of a batch process. This assessment is provided by taking into account an entire course history of a batch process rather than just current conditions of a batch process. This assessment generally involves: (a) collecting data including measured variables obtained during the performance of the batch process (i.e., from a start time $t_0$ to the particular time t); (b) considering each measured variable as a distinct variable; (c) considering a set of measured variables as a collection of variables; and (d) representing the collection of variables as a single vector V. The vector V computation requires the complete batch history, which presents a challenge for online assessment of the state of the batch since the set of measured variables are not fully obtained until the batch process is complete. As a result, the assessment requires the forecasting of future variable measurements. The forecasting of future variable measurements requires filling up unobserved data related to the unperformed portion of the batch process with historical data, i.e., data obtained during a previous performance of a batch process. This forecasting process ensures that the batch conditions of the product being manufactured are compared to archived batch conditions of manufactured products. In effect, the health of the product being manufactured is assessed in a statistical manner.

The conventional methods for online monitoring of batch processes described above suffer from certain drawbacks. For example, historical data is used to forecast future measurements. As a result, there is a possibility of poor prediction of batch evolution, since the use of historical data can bias a decision indicating that the batch condition is normal when in fact the batch condition may be abnormal. In such a scenario, the time between an onset of an abnormal batch condition and its detection is relatively long. Further, conventional methods for online monitoring of batch conditions are generally unable to directly use multivariate statistical analysis tools due to the time varying nature of batch processes.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

Embodiments of the present invention concern batch processing systems and methods for offline and/or online monitoring of batch processes. In the online monitoring scenario, the methods involve building a plurality of multivariate statistical models (MSMs) using archived batch process data (ABPD) for a batch process as a first step. The ABPD comprises stored process data obtained during a plurality of runs of the batch process. The MSMs define boundaries that characterize the normal versus abnormal batch run. It is important that these boundaries be established in a manner that minimizes the chances of a normal batch run being classified as an abnormal run and vise versa. In a second step, a batch condition is monitored online during each batch evolution. The method also involves initiating a current run of the batch process and collecting current batch process data (CBPD) during at least one interval of time during the current run. The interval of time is less than a total predetermined duration for the current run. The method further involves building a feature vector matrix (FVM) using the CBPD. The FVM comprises feature vectors representing statistical measures of wavelet coefficients determined for a plurality of variables. Thereafter, a projection is formed by projecting the feature vectors onto a particular one of the MSMs or a combined multivariate statistical model (CMSM). The CMSM is a weighted averaged of at least two MSMs. At least one estimate for the current run is generated using information provided by the projection.

In the offline monitoring scenario, the methods involve building MSMs using ABPD for a batch process. The methods also involve retrieving recently stored data (RSD) for a recent fully performed run of the batch process. The methods further involve building an FVM using the RSD. Thereafter, a projection is formed by projecting the feature vectors of the FVM onto a CMSM that is a weighted averaged of at least two MSMs.

BRIEF DESCRIPTION OF THE DRAWINGS

Embodiments will be described with reference to the following drawing figures, in which like numerals represent like items throughout the figures, and in which:

FIG. 7 is schematic illustration of a matrix according to an embodiment of the invention.

DETAILED DESCRIPTION OF THE DRAWINGS

Embodiments of the invention provide systems and methods for offline and/or online monitoring of batch processes. Notably, the online methods use batch process data available up to a current time instant at which the health of the batch needs to be assessed. As such, the present invention overcomes certain drawbacks of conventional methods for online monitoring of batch processes (such as the conventional method described above in relation to the Background). For example, the present invention can provide an earlier detection of abnormal batch conditions as compared to the detection provided by conventional methods for online batch process monitoring. As stated above, the phrase "batch condition", as used herein, refers to the state of the product being manufactured during a batch process. An earlier detection of abnormal conditions can facilitate a correction of batch process operations before the abnormal batch condition becomes incurable. The earlier detection of abnormal conditions can also facilitate an earlier termination of a batch process if remedial measures are not possible (such as when a chemical has been contaminated).

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Before describing method embodiments of the present invention, it will be helpful in understanding an exemplary environment in which the methods can be utilized. In this regard, it should be understood that the methods of the present invention can be utilized in any application where a batch process needs to be monitored. Such applications include, but are not limited to, industrial plant applications, food production applications, chemical production applications, specialty product manufacturing applications, and semi-conductor manufacturing applications. Accordingly, methods of the present invention will now be described in relation to one particular application, namely, the industrial plant application.

Figure 1:
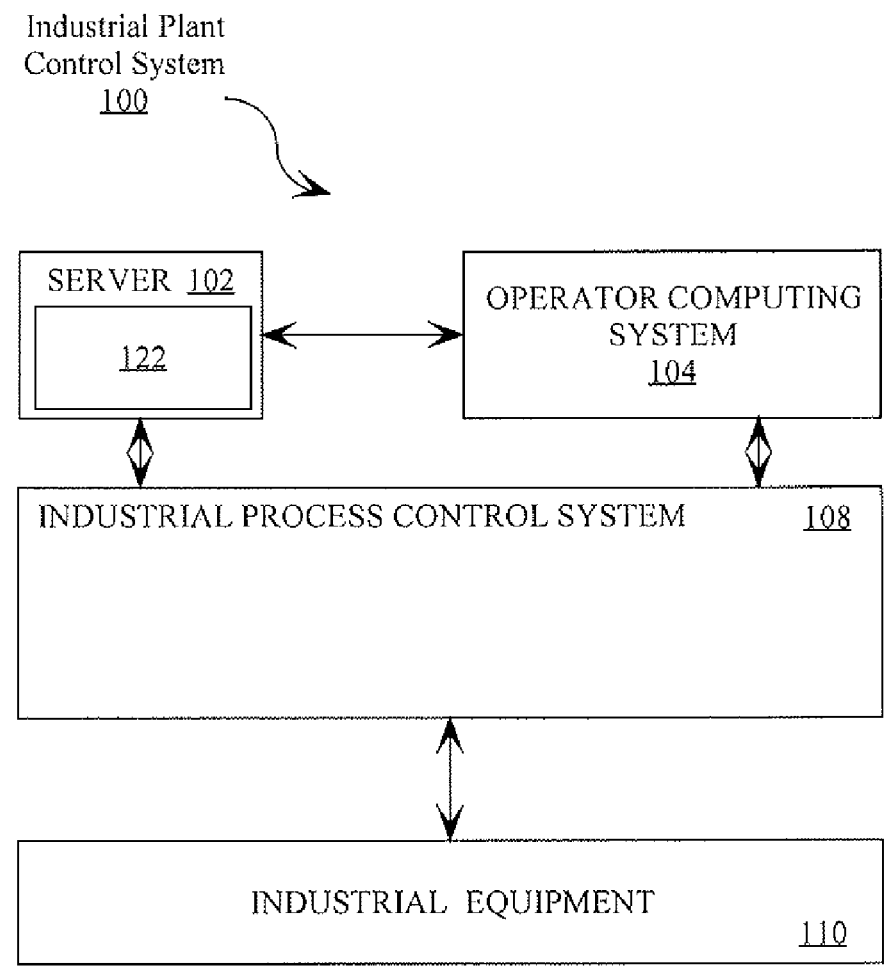
FIG. 1 is a block diagram of a conventional industrial plant control system according to an embodiment of the invention.

Referring now to FIG. 1, there is provided a block diagram of an exemplary industrial plant control system 100 according to an embodiment of the invention. As shown in FIG. 1, the control system 100 comprises a server 102, an operator computing system (OCS) 104, an industrial process control system (IPCS) 108, and industrial equipment 110. It should be noted that the components 102, 108, and 110 are the same as or substantially similar to those contained in a conventional industrial plant control system. However, the OCS 104 can include hardware and/or software configured to implement at least a portion of the present invention. This OCS implementation of the present invention will become more evident as the discussion progresses.

Servers are well known to those having ordinary skill in the art, and therefore will not be described in detail herein. However, it should be understood that the server 102 is configured to perform application specific actions for controlling the industrial equipment 110 and/or monitoring a batch process. As noted above, a batch process is a process that runs for a finite (but variable) duration to produce a batch of a product at the end of the duration. The batch of product can include, but is not limited to, a pharmaceutical, a resin, a composite chemical, and a food product.

Referring again to FIG. 1, the server 102, IPCS 108, and OCS 104 collectively control the industrial equipment 110 and/or facilitate the monitoring of a batch process. In one non-limiting application, the IPCS 108 can be a distributed control system, i.e., there are application specific modules connected to each other, industrial equipment, and operator interfaces via a local control network. The industrial equipment 110 may include, but is not limited to, gauges, valves, transmitters, actuators, and sensors. The invention is not limited in this regard.

As shown in FIG. 1, the server 102 is configured to communicate with the OCS 104 for displaying monitor and/or control information to a user (e.g., an operator, an engineer, a technician, or a supervisor). In this regard, it should be understood that the server 102 can be configured to receive information from the OCS 204 and/or the IPCS 108. Such information generally includes, but is not limited to, batch process data representing sets of samples $s_0, \ldots, s_S$ for each variable $v_0, \ldots, v_J$. The variables $v_0, \ldots, v_J$ are batch process parameter (BPP) values obtained during at least one run of a batch process. Each set of samples $s_0, \ldots, s_S$ includes values for a particular variable $v_0, \ldots, v_J$. The BPD representing sets of samples $s_0, \ldots, s_S$ for the variables $v_0, \ldots, v_J$ can include timestamps. Timestamps facilitate the organization (or segmentation) of samples $s_0, \ldots, s_S$ into groups based on the points of a batch process in which they were obtained. Such BPP values can include, but are not limited to, temperature values, pressure values, pH values, and fluid flow rate values. The server 102 is generally comprised of a memory device 122 for storing the received information.

Figure 10:
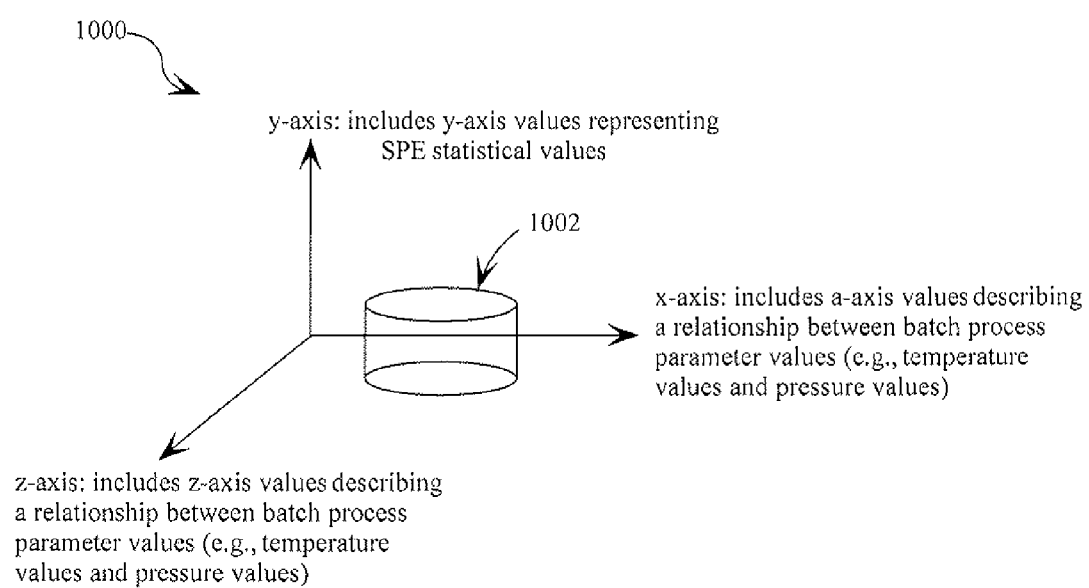
FIG. 10 is a schematic illustration of a multivariate statistical model according to an embodiment of the invention.

The OCS 104 may be a desktop personal computer system, a laptop personal computer system, a personal digital assistant, a mobile computing device, or any other general purpose computer processing device. Accordingly, the OCS 104 is configured to display content in display screen windows. The phrase "display screen window", as used herein, refers to a visual area of a display screen containing content. Such content can include, but is not limited to, still images, video images, an animated image, text, graphs, charts, data, graphical user interfaces (GUIs), multivariate statistical models (e.g., the multivariate statistical models described below in relation to FIGS. 10-11C), or any other information useful in monitoring a desired batch process.

Figure 2:
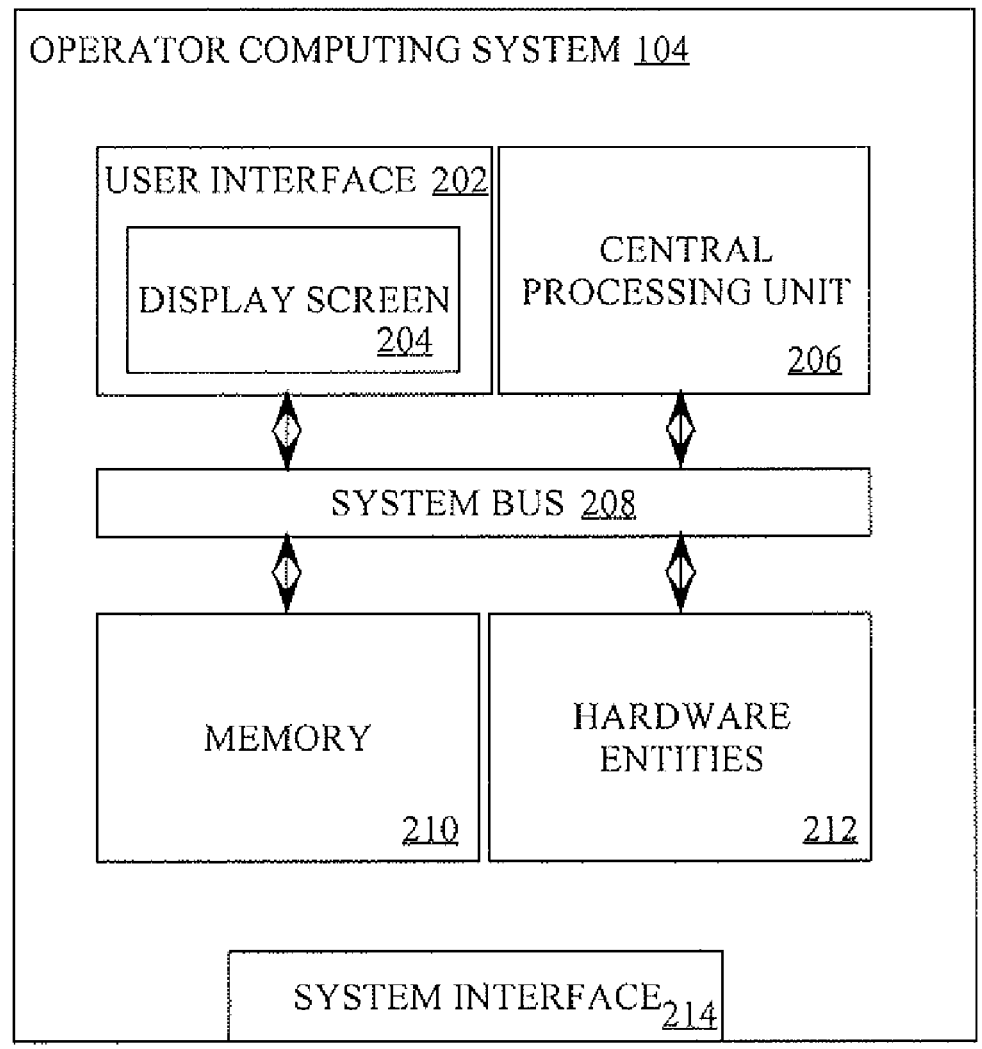
FIG. 2 is a detailed block diagram of the operator computing system of FIG. 1.

Referring now to FIG. 2, there is provided a more detailed block diagram of the OCS 104 of FIG. 1. As shown in FIG. 2, the OCS 104 is comprised of a system interface 214, a user interface 202, a central processing unit 206, a system bus 208, a memory 210 connected to and accessible by other portions of the OCS 104 through the system bus 208, and hardware entities 212 connected to the system bus 208. At least some of the hardware entities 212 perform actions involving access to and use of the memory 210, which for example may be a random access memory (RAM), a disk driver, and/or a compact disc read only memory (CD-ROM).

The hardware entities 212 may include microprocessors, application specific integrated circuits (ASICs), or other hardware. The hardware entities 212 may include a microprocessor programmed for communicating with the server 102 (described above in relation to FIG. 1). More particularly, the hardware entities 212 may include a microprocessor programmed for retrieving historical (or archived) or recently obtained BPD from the server 102. The BPD can include data obtained during actual runs of a batch process and/or data obtained during simulated runs of a batch process. The BPD can also include, but is not limited to, information representing sets of samples $s_0, \ldots, s_S$ for each variables $v_0, \ldots, v_J$ obtained during the performance of at least one batch process. The microprocessor can also be programmed for communicating information defining multivariate statistical models (e.g., the multivariate statistical models described below in relation to FIGS. 10-11C) which characterize normal operations of a batch process. The multivariate statistical models are generally built based on multivariate statistical analysis methods. Such multivariate statistical analysis methods include, but are not limited to, Principal Component Analysis (PCA) based methods, Partial Least Squares (PLS) based methods, and Fisher Discriminant Analysis (FDA) based methods. Each of these listed multivariate statistical analysis methods is well known to those having ordinary skill in the art, and therefore will not be described herein.

The user interface 202 is generally comprised of input devices, output devices, and software routines configured to allow a user to interact with and control software applications installed on the OCS 104. Such input and output devices include, but are not limited to, a display screen 204, a speaker (not shown), a keypad (not shown), a directional pad (not shown), a directional knob (not shown), and a microphone (not shown). As such, the user interface 202 can facilitate a user-software interaction for communicating with the server 102. The user interface 202 can also facilitate user-software interactions for performing the method described below in relation to FIGS. 3A-3B. In this regard, it should be understood that the user interface 202 can facilitate user-software interactions for retrieving archived batch process data (hereinafter referred to as "archived data" and "ABPD") from the server 102 and selecting samples $s_0, \ldots, s_S$ of variables $v_0, \ldots, v_J$ contained in the archived data that represent measured values obtained during operations of a batch process determined to be normal operations. The user interface 202 can also facilitate user-software interactions for dividing samples $s_0, \ldots, s_S$ of variables $v_0, \ldots, v_J$ into a plurality of data segments $S_0, \ldots, S_K$, compressing the data contained in each of the data segments $S_0, \ldots, S_K$, and processing the samples contained in each data segment to generate a composite feature vector matrix (CFVM). The CFVM will be described below in relation to FIG. 3A. The user interface 202 can further facilitate user-software interactions for building multivariate statistical models (e.g., the multivariate statistical models described below in relation to FIGS. 10-11C) using the CFVM and performing online monitoring of a batch process using at least one of the multivariate statistical models.

The system interface 214 allows the OCS 104 to communicate directly or indirectly with the server 102. If the OCS 104 is communicating indirectly with the server 102, then the OCS 104 is sending and receiving communications through a network (not shown). For example, the network (not shown) can be a wireless network such as a local area network, a wide area network, or a personal area network.

FIGS. 3A-5B and accompanying text described below illustrate an exemplary method 300 according to an embodiment of the invention. The method 300 is provided for (a) building multivariate statistical models using a plurality of feature vectors and (b) performing offline and/or online monitoring of a batch process using wavelet based statistical measure (e.g., variance) features. It should be appreciated, however, that the method disclosed herein is provided for purposes of illustration only and that embodiments of the present invention are not limited solely to the particular method shown.

Figure 3A:
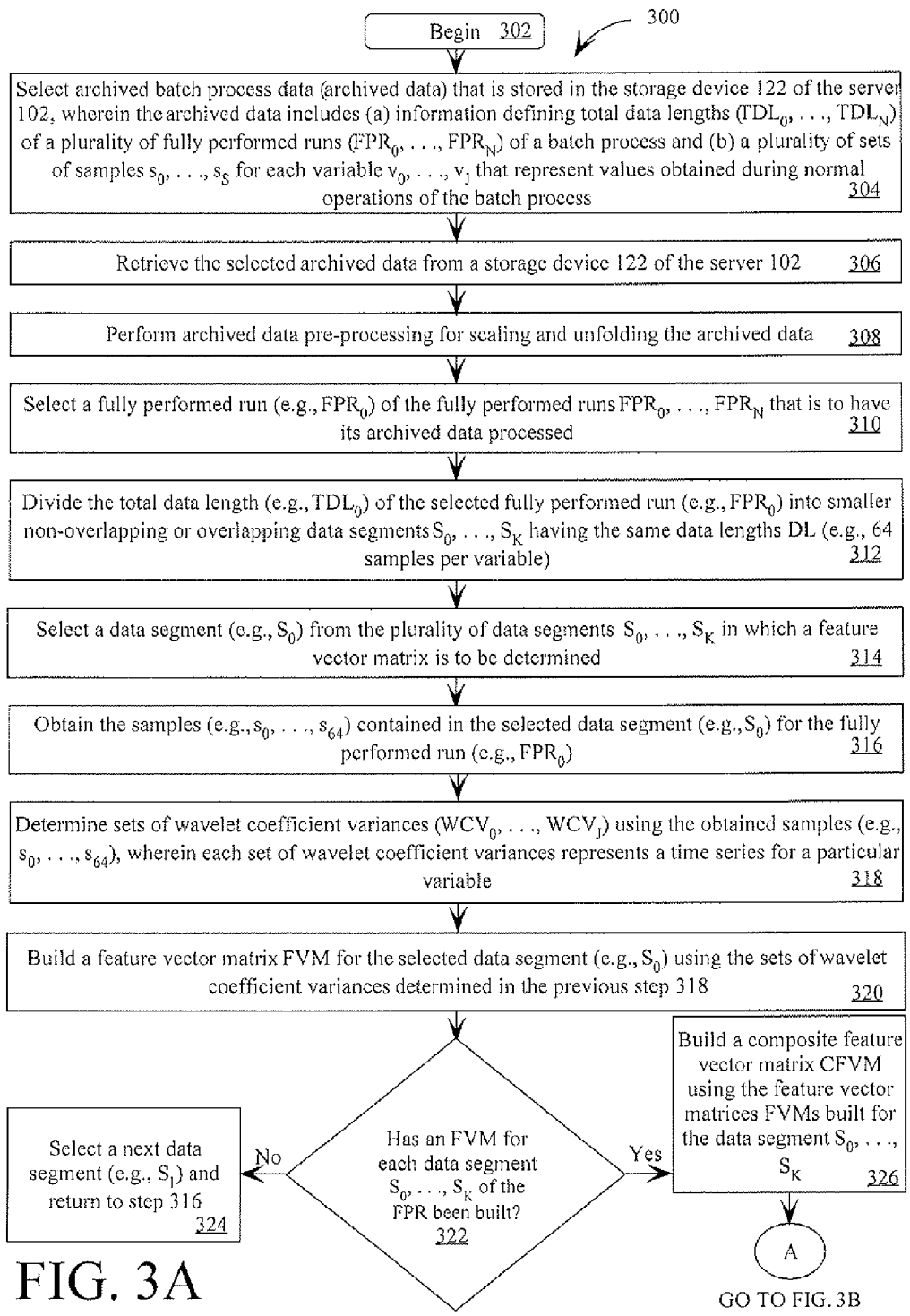
FIGS. 3A-3B collectively provide a flow diagram of a method for online monitoring of a batch process using wavelet based statistical measure (e.g., variance) features according to an embodiment of the invention.

Referring now to FIG. 3A, the method 300 begins with step 302 and continues to step 304. In step 304, archived data is selected. The archived data is stored historical data that was obtained during the performance of a plurality of batch processes. The archived data can be stored in a memory device 122 of a server 102 (described above in relation to FIG. 1) in accordance with any suitable data storage format. As noted above, the archived data can include data obtained during actual runs of a batch process and/or data obtained during simulated runs of a batch process. The archived data can also include information defining total data lengths ($TDL_0, \ldots, TDL_N$) of a plurality of fully performed runs ($FPR_0, \ldots, FPR_N$) of a batch process. The archived data can further include a plurality of sets of samples $S_0, \ldots, s_S$ for each variable $v_0, \ldots, v_J$ that represent values obtained during normal operations of the batch process. The sets of samples $s_0, \ldots, s_S$ can be used to build multivariate statistical models based on a multivariate statistical analysis method. After selecting the archived data, step 306 is performed where the selected archived data is retrieved from the memory device 122 of the sever 102.

Thereafter, method 300 continues with step 308. In step 308, the archived data is pre-processed. It should be noted that step 308 is performed for placing the archived data in a format required by multivariate statistical analysis methods. In this regard, it should be understood that multivariate statistical analysis methods use two way arrays of data. In contrast, the archived data is expressed as a three way array of data. The three way array is defined by a variable $v_0, \ldots, v_J$, a time, and a run of the batch process. If the archived data is to be used in a multivariate statistical analysis method, then the three way array of the archived data is scaled and unfolded into a two way array of scaled archived data.

The archived data can be scaled using any scaling method known to those having ordinary skill in the art. It should be noted that the present invention uses multivariate statistical analysis methods to monitor the status of a batch of product. The multivariate statistical analysis methods rely solely on data obtained during the performance of a batch process, i.e., the multivariate statistical analysis methods do not require knowledge of the batch process. The data used in the multivariate statistical analysis methods can include, but is not limited to, data representing temperature values, data representing pressure values, data representing pH values and data representing concentration of a reactant. The measurement units of the each type of values are different. For example, the temperature values vary from three hundred degrees Kelvin (300° K) to four hundred degrees Kelvin (400° K). The pressure values vary from one pound per square inch (1 psi) to five pounds per square inch (5 psi). The pH values vary from five (5) to five and half (5.5). If the temperature and pressure values are used by the multivariate statistical analysis methods, then the multivariate statistical analysis methods are more sensitive to temperature and less sensitive to pressure. This sensitivity characteristic of the multivariate statistical analysis methods is due to the fact that the temperature values are greater than the pressure values. In order to equalize the contribution of each type of value, the data is scaled in step 308.

The archived data can be unfolded in accordance with a particular unfolding technique. The unfolding techniques generally involve unfolding the three way array of archived data slice by slice and arranging the slices in a generally sequential manner. Schematic illustrations of unfolding techniques according to embodiments of the invention are provided in FIGS. 6A-6C. The unfolding techniques of FIGS. 6A-6C generally involve slicing a three way data matrix (across an x-axis, a y-axis, and a z-axis) and arranging the slices in a generally sequential manner.

Figure 6A:
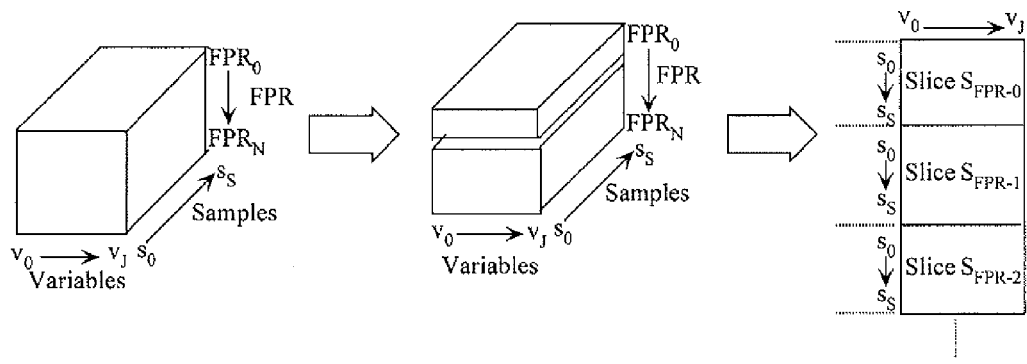
FIGS. 6A-6C are schematic illustrations of data unfolding techniques according to embodiments of the invention.

A first unfolding technique will now be described in relation to FIG. 6A. As shown in FIG. 6A, the first unfolding technique generally involves unfolding the three way array of archived data horizontal slice by horizontal slice. Each horizontal slice $S_{FPR-0}, \ldots, S_{FPR-N}$ includes data for a single fully performed run $FPR_0, \ldots, FPR_N$ of a batch process. The data contained in each horizontal slice $S_{FPR-0}, \ldots, S_{FPR-N}$ includes a set of samples $s_0, \ldots, s_S$ for each variable $v_0, \ldots v_J$. Each of the slices $S_{FPR-0}, \ldots, S_{FPR-N}$ is arranged in a substantially sequential manner based on the batch process run number 0-N.

Figure 6B:
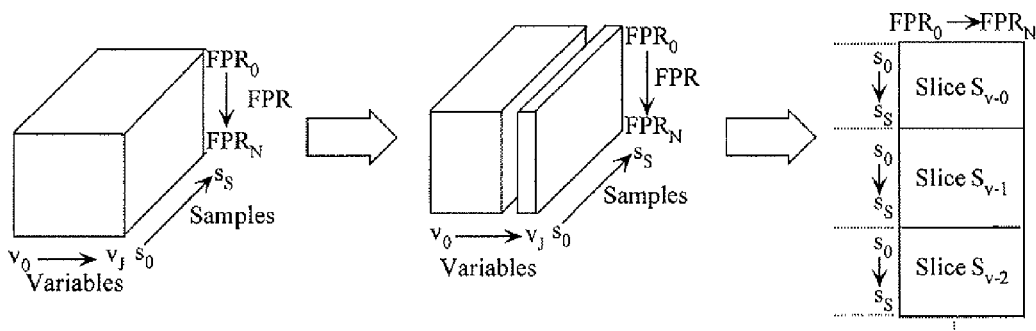

A second unfolding technique will now be described in relation to FIG. 6B. As shown in FIG. 6B, the second unfolding technique generally involves unfolding the three way array of archived data slice by vertical slice by vertical slice. Each vertical slice $S_{v-0}, \ldots, S_{v-J}$ includes data for a single variable $v_0, \ldots v_J$. The data contained in each vertical slice $S_{v-0}, \ldots, S_{v-N}$ includes sets of samples $s_0, \ldots, s_S$ for each fully performed run $FPR_0, \ldots, FPR_N$ of a batch process. Each of the slices $S_{v-0}, \ldots, S_{v-J}$ is arranged in a substantially sequential manner based on the variable number 0-J.

Figure 6C:
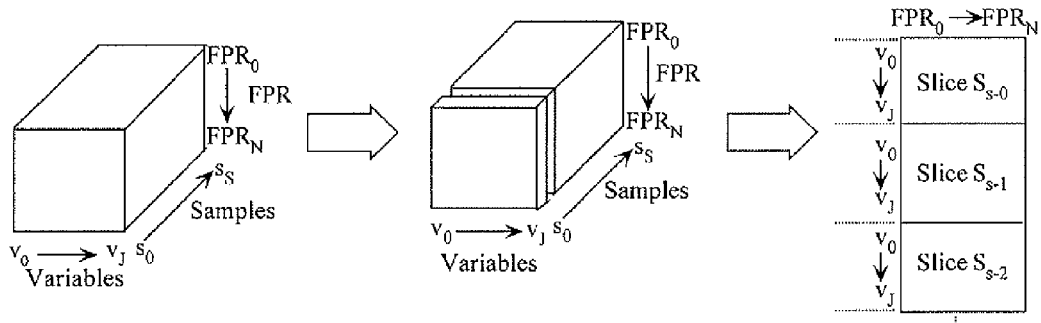
Figure 8A:
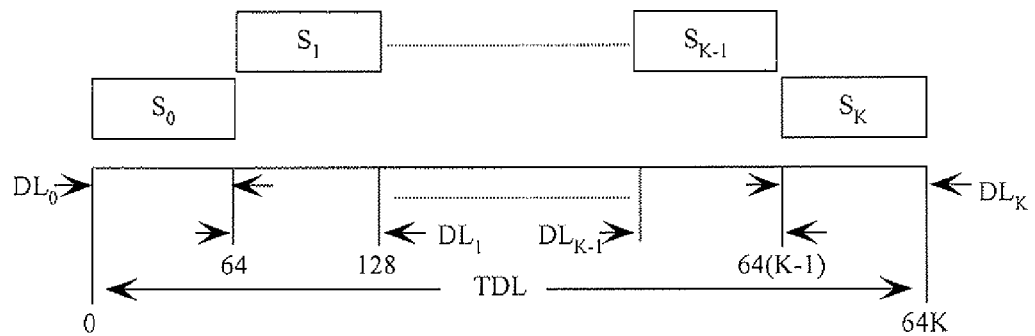
FIGS. 8A-8B are schematic illustrations of data segmentation according to embodiments of the invention.
Figure 8B:
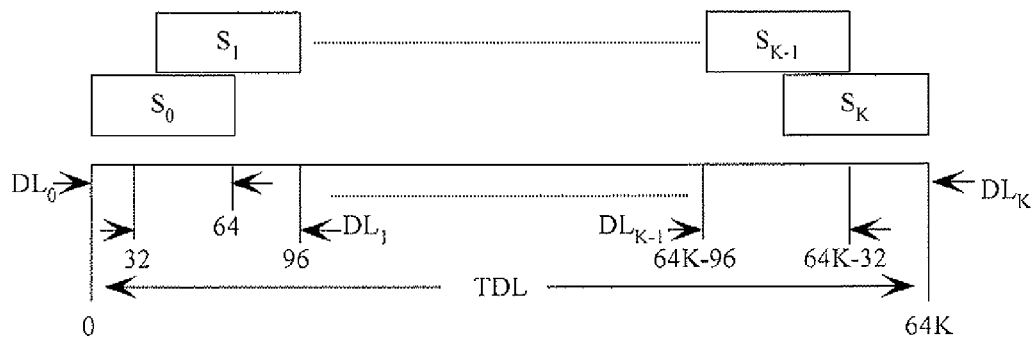

A third unfolding technique will now be described in relation to FIG. 6C. As shown in FIG. 6C, the third unfolding technique generally involves unfolding the three way array of archived data vertical slice by vertical slice. Each vertical slice $S_{s-0}, \ldots, S_{s-S}$ includes data representing values for a particular sample $s_0, \ldots, s_S$ of the variables $v_0, \ldots v_J$. Each of the values represents a value obtained during a certain point of a fully performed run $FPR_0, \ldots, FPR_N$ of a batch process. Each of the slices $S_{s-0}, \ldots, S_{s-S}$ is arranged in a substantially sequential manner based on the sample number 0-S.

It should be noted that each of the above described unfolding techniques results in a two way array of data. Since the runs $FPR_0, \ldots, FPR_N$ of a batch process can have different lengths (or durations), the two way array of data gives rise to the matrix shown in FIG. 7. As shown in FIG. 7, each run $FPR_0, \ldots, FPR_N$ can have a different length (or total duration). As such, the performance of each run $FPR_0, \ldots, FPR_N$ can result in a different number of sets of values for the variables $v_0, \ldots v_J$. The differing batch lengths pose difficulties in applying the multivariate statistical tools which need to be systematically addressed. Accordingly, embodiments of the present invention use wavelet based approximation techniques for handling the varying batch lengths (or total durations). An exemplary wavelet based approximation technique is described below in relation to steps 310-326 of FIG. 3A. However, it should be understood that wavelet based approximation techniques can approximate sharp changes in time profiles for the variable $v_0, \ldots, v_J$. Wavelet based approximation techniques can also approximate discontinuities present in the time profiles for the variable $v_0, \ldots, v_J$. The improved approximation methods based on wavelet enable an accurate establishment of the boundaries of normal operation. As a result of the accurate boundary establishment, that facilitates the use of heuristics, "Type I errors" can be minimized without increasing "Type II errors". "Type I, II errors" are well known to those having ordinary skill in the art, and therefore will not be described herein. However, it should be understood that the phrase "Type I error" generally refers to the abnormal classification of a batch of product that is actually normal. The phrase "Type II error" generally refers to the normal classification of a batch of product that is actually abnormal. The clearer characterization of the boundaries of normal operation facilitates early detection of abnormal events.

Referring again to FIG. 3A, method 300 continues with steps 310 and 312. In step 310, a fully performed run (e.g., $FPR_0$) is selected. The selected fully performed run (e.g., $FPR_0$) includes archived data that is to be subsequently processed. In step 312, the total data length (e.g., $TDL_0$) of the selected fully performed run (e.g., $FPR_0$) is divided into smaller non-overlapping or overlapping data segments $S_0, \ldots, S_K$. Notably, the data segments have the same data lengths $DL=DL_0, \ldots, DL_K$. The data lengths $DL_0, \ldots, DL_K$ can be selected based on a statistical stationarity or prior knowledge of batch conditions that occur at particular points of one or more runs of the batch process. As noted above, the phrase "batch condition" refers to the state of the product being manufactured during a batch process. In such a scenario, DL is selected by observing value variances of the variables $v_0, \ldots, v_J$ contained in the selected archived data. According to an embodiment of the invention, $DL=2^L$, where l is the number of frequency scales used in a wavelet based method for determining a set of wavelet coefficients variances (e.g., the method described below in relation to FIG. 4). The invention is not limited in this regard.

The data segments $S_0, \ldots, S_K$ can be non-overlapping durations or overlapping data segments. However, it should be noted that overlapping data segments reduce the chance that false alarms will occur during an online monitoring of a batch process. The false alarms can occur as a result of partial availability of data obtained during a certain time period of a batch process. Overlapping data segments can also reduce a wait time between assessments of batch conditions. Overlapping data segments can facilitate an online batch monitoring process for continuously predicting whether the operations of the batch process are normal. A schematic illustration of non-overlapping data segments is provided in FIG. 6A. A schematic illustration of overlapping data segments is provided in FIG. 6B.

It should be noted that the data segments can overlap by any percentage selected in accordance with a particular online monitoring application. For example, the data segments can overlap by fifty percent (50%) or seventy-five percent (75%). If the data segments overlap by fifty percent (50%), then a minimum average run length time (ARL) can be defined by the following mathematical equation (1).

$$ARL=DL/2 \tag{1}$$

where DL is a data length of a data segment. If the data segments overlap by seventy-five percent (75%), then a minimum average run length time (ARL) can be defined by the following mathematical equation (2).

$$ARL=DL/4 \tag{2}$$

The phrase "average run length time (ARL)", as used herein, refers to the amount of time on average that has elapsed between the time of occurrence of an abnormal operation and its eventual detection during the evolution of a batch process. The invention is not limited in this regard. The data segments can overlap by any given percentage.

Subsequent to completing step 312, the method 300 continues with step 314. In step 314, a data segment (e.g., $S_0$) is selected from the plurality of data segments $S_0, \ldots, S_K$ in which a feature vector matrix is to be determined. Thereafter, step 316 is performed where samples (e.g., $s_0, \ldots, s_{64}$) contained in the selected data segment (e.g., $S_0$) are obtained.

In step 318, sets of wavelet coefficient variances $WCV_0, \ldots, WCV_J$ are determined using the samples (e.g., $s_0, \ldots, s_{64}$) obtained in the previous step 316. Each of the sets of wavelet coefficient variances $WCV_0, \ldots, WCV_J$ represents a time series for a respective variable $v_0, \ldots, v_J$ of the selected data segment (e.g., $S_0$).

Figure 9:
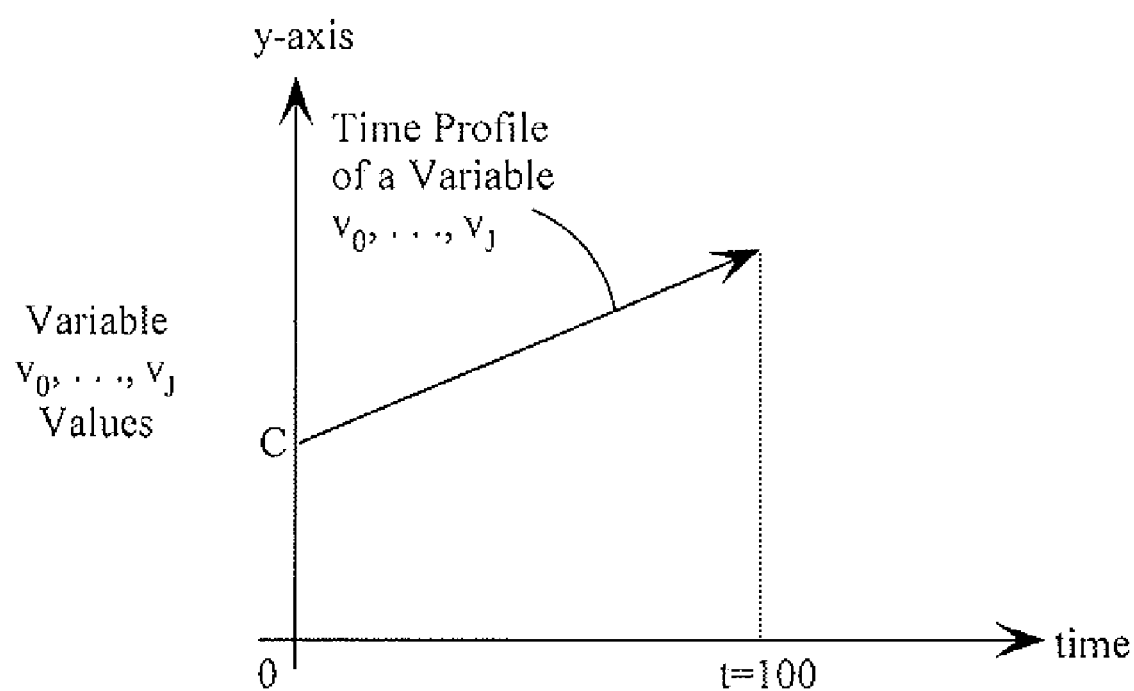
FIG. 9 is a graph illustrating an exemplary time profile of a variable contained within an archived batch process data segment $S_0, \ldots, S_N$.

The following discussion of variable time profiles is provided to assist a reader in understanding how a time series for a variable is determined. A schematic illustration of an exemplary time profile for a variable $v_0, \ldots, v_J$ is provided in FIG. 9. As shown in FIG. 9, the exemplary time profile of a variable $v_0, \ldots, v_J$ is a straight line. A signal having the same time profile can be defined by the following mathematical equation (3).

$$V=mT+C \tag{3}$$

where V is time data of a variable. T is time. m is slope of the line. C is an intercept on the y-axis that represents the value of V when T is equal to zero (T=0). Accordingly, the time series of the variable can be represented by a set of values, namely m and C.

As should be understood by those having ordinary skill in the art, a wavelet based analysis using a variable $v_0, \ldots, v_J$ can provide a set of values (like m and C) which represent a time series of a variable $v_0, \ldots, v_J$. A discussion of how the sets of values can be determined using a wavelet based analysis is provided below in relation to FIG. 4. It should be noted that each of the sets of values determined using a wavelet based analysis additionally includes variance estimates of wavelet coefficients for a plurality of frequency-scales of signals. The additional sets of parameters that include the variance estimates enables more accurate monitoring of batch runs having variable durations. Specific events during the batch runs (such as parameter changes) can also occur at different times for different runs of a batch process. Inclusion of the variance estimate of wavelet coefficients facilitates a clear classification of normal batch runs versus abnormal batch runs (even in the presence of timing differences of the performance of specific events). It should also be noted that step 318 is performed for compressing the data representing each of the variables $v_0, \ldots, v_J$ of the selected data segment (e.g., $S_0$). The data compression generally results in faster data processing times and less complex computations using the data of the data segments.

After determining the sets of wavelet coefficient variances $WCV_0, \ldots, WCV_J$, method 300 continues with step 320. In step 320, a feature vector matrix FVM for the selected data segment (e.g., $S_0$) is determined using the sets of wavelet coefficient variances $WCV_0, \ldots, WCV_J$ determined in the previous step 318. The feature vector matrix FVM comprises a plurality of feature vectors. The phrase "feature vector", as used herein, refers to wavelet coefficient variances contained in the feature vector matrix FVM. The feature vector matrix FVM has a size defined by the following mathematical equation (4).

$$\text{Size}_{FV}=(N_{SCALES}+1)\cdot(N_{VARIABLES}) \tag{4}$$

where $\text{Size}_{FV}$ is the size of the feature vector matrix FVM. $N_{SCALES}$ is the number of frequency-scales of a signal. $N_{VARIABLES}$ is the number of variables contained within the selected data segment (e.g., $S_0$). It should be noted that a wavelet coefficient at a given time and frequency-scale is obtained by taking an inner product of time-series and the wavelet function defined at the given time and frequency-scale. As such, wavelet coefficient generally represent a contribution or strength of the time series for a variable at the given time and frequency-scale. A frequency-scale is inversely proportional to frequency. Frequency-scales are obtained by the performance of a wavelet transform decompose (WTD) process. The WTD process generally involves wavelet transform decomposing a given time series into different frequency (or scales) bands.

Figure 3B:
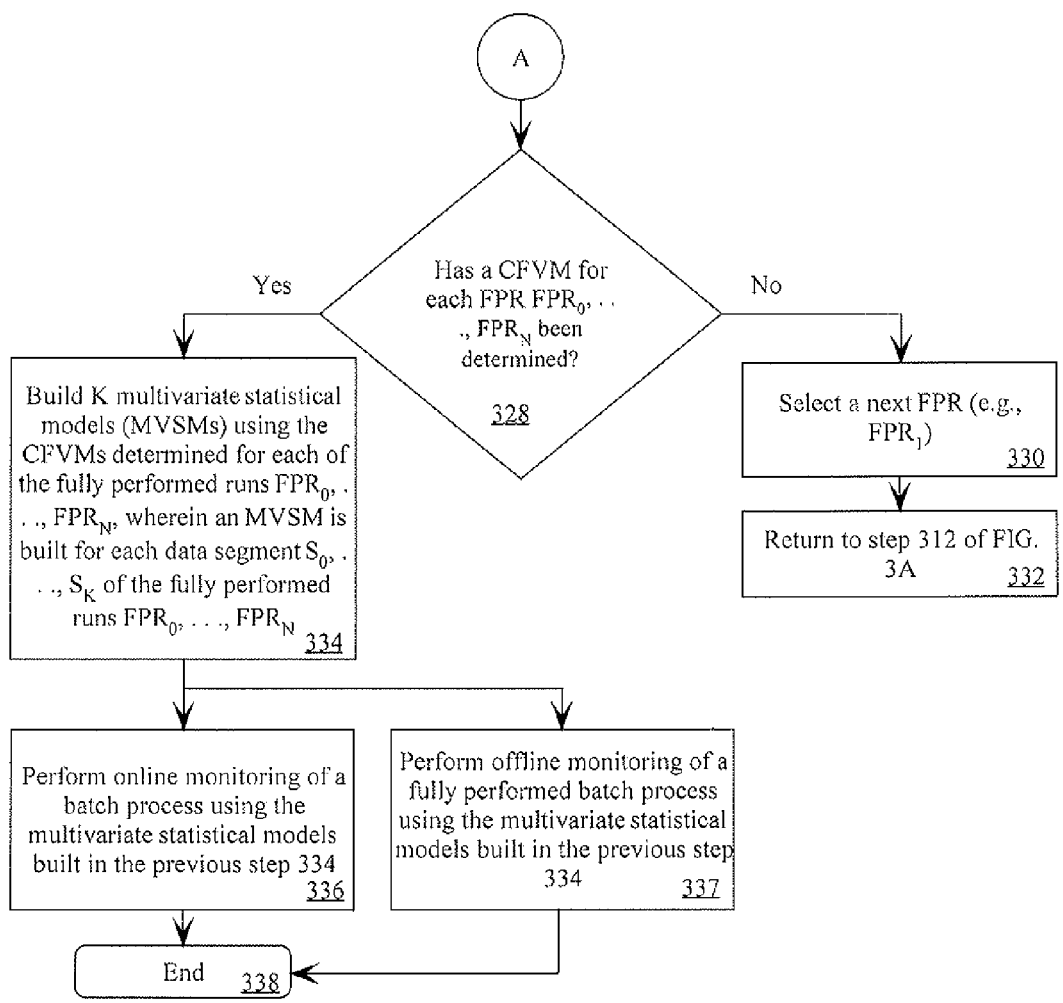

Thereafter, method 300 continues with a decision step 322. If a feature vector matrix FVM has not been built for each data segment $S_0, \ldots, S_K$ [322:NO], then method 300 continues with step 324. Step 324 involves selecting a next data segment (e.g., $S_1$) for processing. After selecting the next data segment (e.g., $S_1$), method 300 returns to step 316. If a feature vector matrix FVM has been built for each data segment $S_0, \ldots, S_K$ [322:YES], then method 300 continues with step 326. In step 326, a composite feature vector matrix CFVM is built using the feature vector matrices FVMs built for the data segments $S_0, \ldots, S_K$. Upon building the composite feature vector matrix CFVM, a decision step 328 of FIG. 3B is performed.

If a composite feature vector matrix CFVM has not been determined for each fully performed run $FPR_0, \ldots, FPR_N$ [328:NO], then method 300 continues with steps 330 and 332. Step 330 involves selecting a next fully performed run (e.g., $FPR_1$). Step 332 involves returning to step 312 of FIG. 3A. If a composite feature vector matrix CFVM has been determined for each fully performed run $FPR_0, \ldots, FPR_N$ [328:YES], then method 300 continues with step 334.

In step 334, "K" multivariate statistical models MVSMs are built using the composite feature vector matrices CFVMs determined for each of the fully performed runs $FPR_0, \ldots, FPR_N$. In this regard, it should be understood that a multivariate statistical model MVSM is built for each data segment $S_0, \ldots, S_K$ of the fully performed runs $FPR_0, \ldots, FPR_N$ using a feature vector matrix FVM of each data segment $S_0, \ldots, S_K$, respectively. As noted above, the multivariate statistical models MVSMs can be built based on multivariate statistical analysis methods. Such multivariate statistical analysis methods include, but are not limited to, Principal Component Analysis (PCA) based methods, Partial Least Squares (PLS)

based methods, and Fisher Discriminant Analysis (FDA) based methods. Each of the listed multivariate statistical analysis methods is well known to those having ordinary skill in the art, and therefore will not be described herein.

According to an embodiment of the invention, the multivariate statistical models MVSMs are built based on a PCA based method. The PCA based method provides a means for describing a relationship between batch process parameter values (e.g., temperature values, pressure values, pH values, and fluid flow rate values). A schematic illustration of an exemplary PCA model 1000 is provided in FIG. 10. PCA models are well known to those having ordinary skill in the art, and therefore will not be described in detail herein. However, it should be understood that a PCA model 1000 comprises a y-axis, an x-axis, a z-axis, and a three-dimensional object 1002. The y-axis includes y-axis values representing Squared Prediction Error (SPE) statistical values. SPE provides a measure of how the relationships between the process variables compare with those identified under normal operating conditions. Smaller SPE values indicate that batch process measurements are normal. In contrast, larger SPE values indicate that the batch process measurements are abnormal. The x-axis includes x-axis values representing a relationship between batch process parameter values. For example, if a pH in a vessel is controlled by manipulating an acid feed rate, then the x-axis includes values describing a relationship between pH measurements and acid flow. Similarly, the z-axis includes z-axis values representing a relationship between batch process parameter values. The three-dimensional object 1002 represents an envelope of normal operating conditions of a batch process. The invention is not limited in this regard.

It should also be noted that overlapping data segments $S_0, \ldots, S_K$ generally require more multivariate statistical models to be built in the step 334 of FIG. 3B. However, the multivariate statistical models are built offline, and therefore do not affect the complexity of an online monitoring of a batch process (described below in relation to FIGS. 5A-5B).

Referring again to FIG. 3B, method 300 continues with step 336 and/or step 337. In step 336, online monitoring of a batch process is performed. Step 336 involves using at least one of the multivariate statistical models built in the previous step 334. A method for performing an online monitoring of a batch process using at least one multivariate statistical model will be described below in relation to FIGS. 5A-5B. In step 337, offline monitoring of a fully performed run of a batch process is performed. Offline monitoring will be described in detail below in relation to FIG. 12. Subsequent to completing step 336 and/or step 337, step 338 is performed where method 300 ends.

Figure 4:
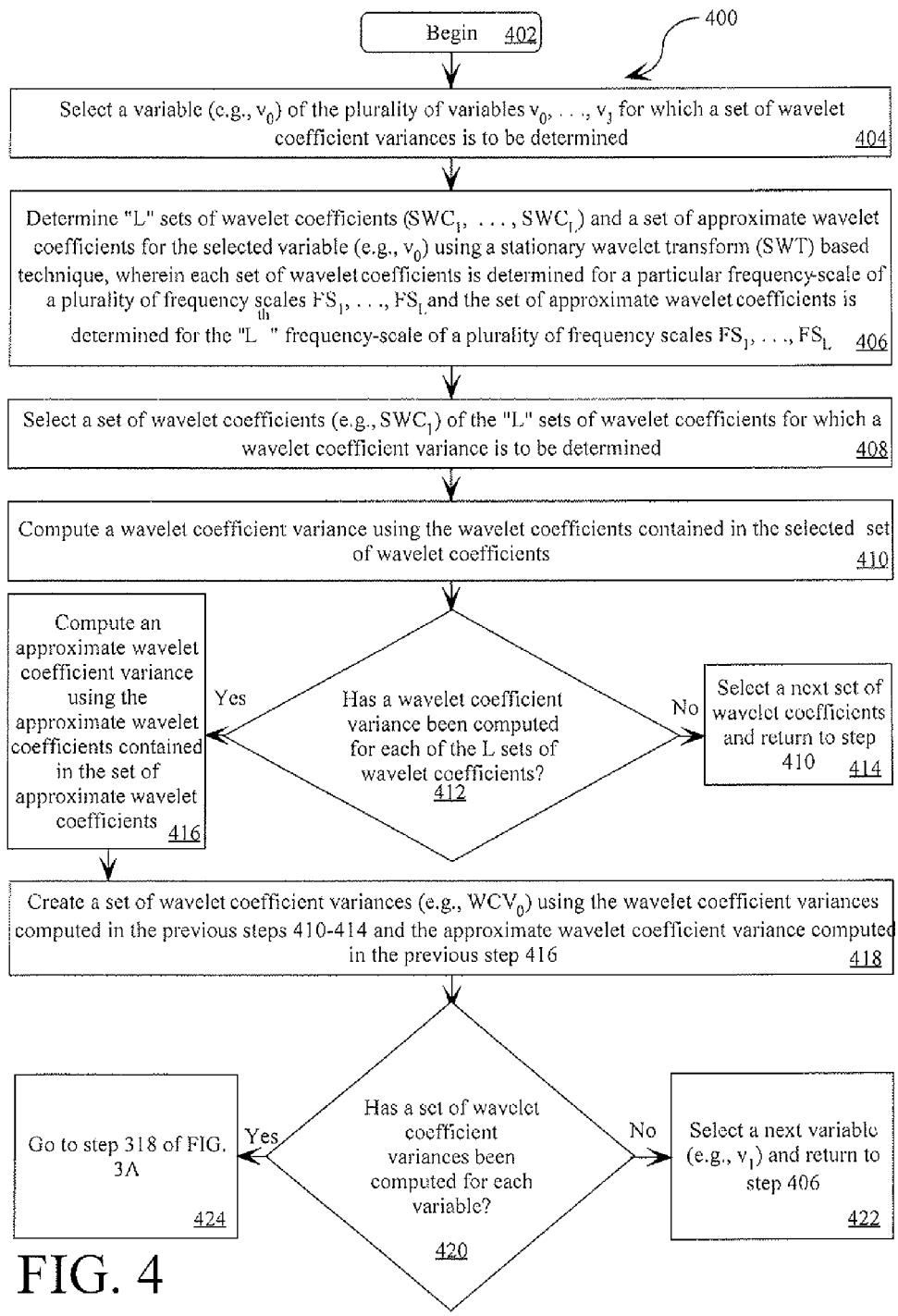
FIG. 4 is a flow diagram of a method for determining a set of wavelet coefficient variances using wavelet based analysis according to an embodiment of the invention.

Referring now to FIG. 4, there is provided a flow diagram of a method 400 for determining sets of wavelet coefficient variances $WCV_0, \ldots, WCV_J$ using a wavelet based analysis. Method 400 can be performed in step 318 of FIG. 3A for purposes of compressing data representing each of the variables $v_0, \ldots, v_J$ of a selected data segment $S_0, \ldots, S_K$.

A wavelet based analysis can involve determining wavelet coefficients of a time domain signal of a variable $v_0, \ldots, v_J$. A time profile of the time domain signal can be approximated by multiplying wavelet coefficients by wavelet functions. The time profile approximation of the signal can be defined by the following mathematical equation (5).

$$f(t) = \sum_0^n c_n \Phi_n \quad (5)$$

where f(t) is a time domain of a signal. n represents frequency-scales of the signal. $c_n$ represents values of wavelet coefficients for each frequency-scale of the signal. $\Phi_n$ represents wavelet functions for each frequency-scale of the signal.

Accordingly, a time series of the signal can be represented as a set of values including variance estimates of the wavelet coefficients $c_n$ for each frequency-scale of the signal. As such, method 400 generally involves applying a wavelet transform to a variable $v_0, \ldots, v_J$ to (a) determine a plurality of frequency-scales and (b) determine statistical measure estimates of the wavelet coefficients $c_n$ for each of the frequency-scales. According to an embodiment of the invention, the statistical measure estimates of the wavelet coefficients are variance estimates of the wavelet coefficients. The invention is not limited in this regard.

Referring again to FIG. 4, method 400 begins with step 402 and continues to step 404. In step 404, a variable (e.g., $v_0$) is selected for which a set of wavelet coefficient variances is to be determined. Subsequently, step 406 is performed where "L" sets of wavelet coefficients $SWC_1, \ldots, SWC_L$ for the selected variable (e.g., $v_0$) are determined. The "L" sets of wavelet coefficients $SWC_1, \ldots, SWC_L$ can generally be determined using a Stationary Wavelet Transform (SWT) scheme with a number of levels L. If the SWT scheme is employed with a number of levels L, then each of the sets of wavelet coefficient variances is determined for a particular frequency scale of a plurality of frequency scales $FS_0, \ldots, FS_L$. Step 406 also involves determining a set of approximate wave coefficients for the selected variable (e.g., $v_0$). The set of approximate wave coefficients can also generally be determined using a Stationary Wavelet Transform (SWT) scheme with a number of levels L. If the SWT scheme is employed with a number of levels L, then the set of approximate wave coefficients is determined for the "$L^{th}$" frequency scale of the plurality of frequency scales $FS_0, \ldots, FS_L$. The invention is not limited in this regard. For example, a Discrete Wavelet Transform (DWT) scheme can also be used to wavelet transform the variables $v_0, \ldots v_J$ of an data segment $S_0, \ldots S_K$. SWT and DWT schemes are well known to those having ordinary skill in the art, and therefore will not be described in herein.

After completing step 408, method 400 continues with steps 408 and 410. In step 408, a selection is made. The selection involves selecting a set of wavelet coefficients (e.g., $SWC_1$) of the "L" sets of wavelet coefficients $SWC_1, \ldots, SWC_L$ for which a wavelet coefficient variance is to be determined.

Step 410 involves computing a wavelet coefficient variance using the wavelet coefficients contained in the set of wavelet coefficients (e.g., $SWC_1$) selected in the previous step 408. Upon completing step 410, method 400 continues with a decision step 412. If a wavelet coefficient variance has not been computed for each of the "L" sets of wavelet coefficients [412:NO], then step 414 is performed where a next set wavelet coefficients (e.g., $SWC_2$) is selected. Step 414 also involves returning to step 410. If a wavelet coefficient variance has been computed for each of the "L" sets of wavelet coefficients [412:YES], then step 416 is performed. In step 416, an approximate wavelet coefficient variance is computed using the approximate wavelet coefficients contained in the set of approximate wavelet coefficients.

After completing step 416, method 400 continues with step 418. In step 418, a set of wavelet coefficient variances (e.g., $WCV_0$) is created using the wavelet coefficient variances computed in the previous steps 410-414 and the approximate coefficient variances computed in the previous step 416. Subsequently, method 400 continues with a decision step 420. If a set of wavelet coefficient variances has not been computed for each variable $v_0, \ldots v_J$ [420:NO], then step 422 is performed. In step 422, a next variable (e.g., $v_1$) is selected. Step 422 also involves returning to step 406. If a set of wavelet coefficient variances has been computed for each variable $v_0, \ldots v_J$ [420:YES], then step 424 is performed. In step 424, method 400 can got to step 318 of FIG. 3A.

Figure 5A:
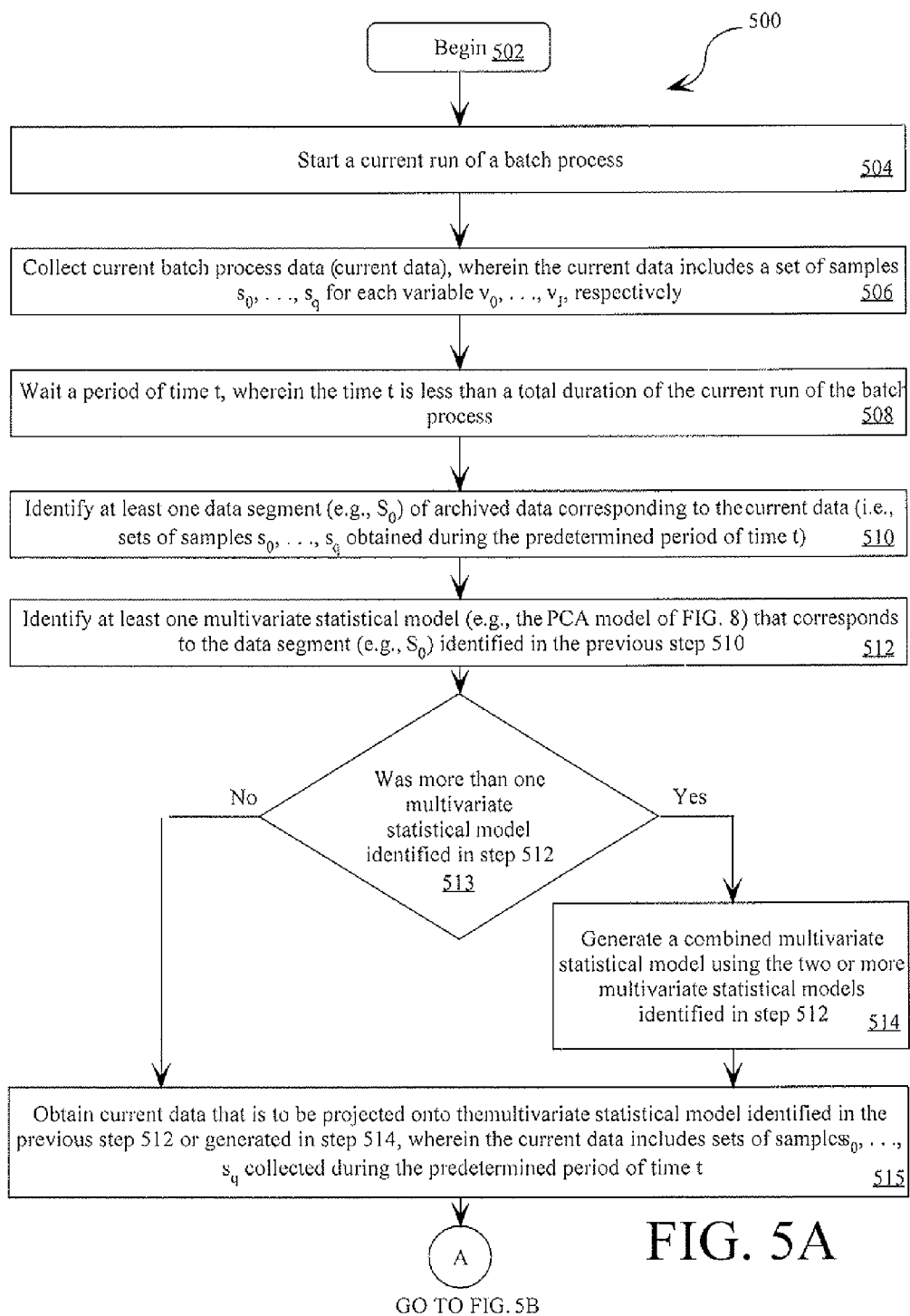
FIGS. 5A-5B collectively provide a method for performing an online monitoring of a batch process using multivariate statistical models according to an embodiment of the invention.
Figure 5B:
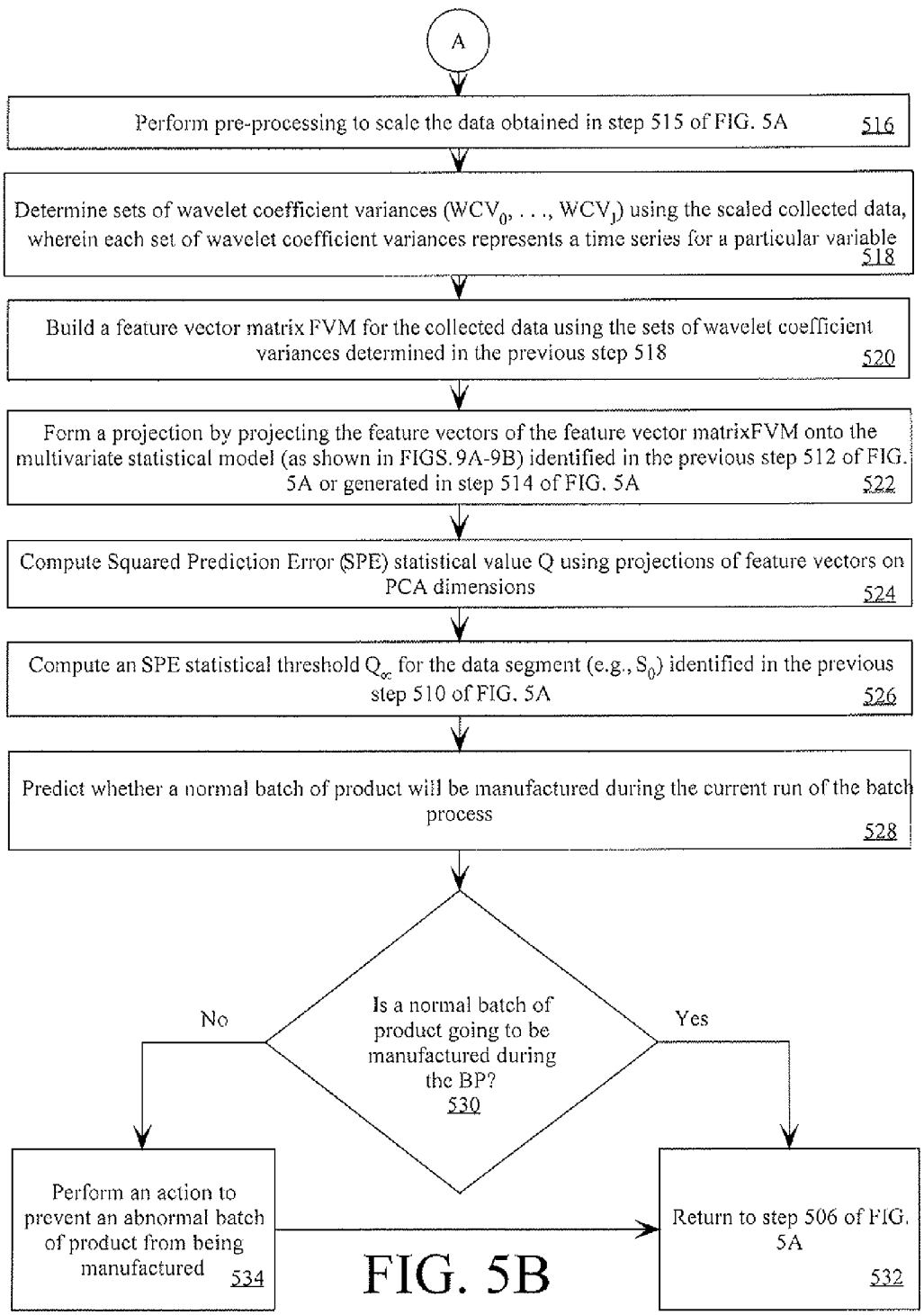

Referring now to FIGS. 5A-5B, there is provided a flow diagram of a method 500 for performing an online monitoring of a batch process using at least one multivariate statistical model built in step 334 of FIG. 3B. Notably, method 500 can be performed in step 336 of FIG. 3B. As shown in FIG. 5A, the method 500 begins with step 502 and continues with step 504. In step 504, a current run of a batch process is started. After completing step 504, step 506 is performed where current batch process data (hereinafter referred to as "current data") is collected. The current data can include information defining values for a plurality of variables $v_0, \ldots, v_J$. More particularly, the current data can include a plurality of samples $s_0, \ldots, s_q$ for each of the variables $v_0, \ldots, v_J$. The samples $s_0, \ldots, s_q$ are batch process parameter values obtained during the performance of a current run of the batch process. In step 508, the method 500 waits a period of time "t" that is less than the total duration of the current run of the batch process. The period of time "t" can be used for choosing multivariate statistical models by identifying the data segments corresponding to the current data.

After the period of time "t" has lapsed, method 500 continues with steps 510 and 512. In step 510, at least one data segment $S_0, \ldots, S_K$ is identified that corresponds to the current data. More particularly, the identified data segment(s) $S_0, \ldots, S_K$ correspond(s) to a set of samples $s_0, \ldots, s_q$ collected during the current run of the batch process which have the most recent timestamps, i.e., the set of variables that were obtained during the predetermined period of time "t". Step 510 can further involve determining if the time instant "t" is an end point of a data segment (e.g., data segment $S_1$). If the time instant "t" is determined to be an end point of the data segment (e.g., data segment $S_1$), then the data segment is identified in step 510. If the time instant "t" is determined not to be an end point of the data segment (e.g., data segment $S_1$), then relevant segments (e.g., $S_0, S_2$) which encompass the data segment (e.g., data segment $S_1$) are identified in step 510. In step 512, at least one multivariate statistical model is identified. The identified multivariate statistical model(s) corresponds to the data segment(s) $S_0, \ldots, S_K$ identified in the previous step 510.

Subsequently, method 500 continues with a decision step 513. If a single multivariate statistical model was identified in step 512 [513:NO], then method 500 continues with step 515. If two or more multivariate statistical models were identified in step 512 [513:YES], then method 500 continues with step 514. In step 514, a combined multivariate statistical model (CMSM) is generated using the two or more multivariate statistical models identified in step 512. The CMSM is a linear combination (or weighted average) of the multivariate statistical models identified in step 512.

The CMSM is generated by determining weights for each of the multivariate statistical models identified in step 512. The weights are determined by analyzing the fraction of the archived data contained in the respective data segments $S_0, \ldots, S_K$. For example, if a data segment $S_2$ contains more archived data than a data segment $S_0$, then the multivariate statistical model for the archived data segment $S_2$ is given more weight than the multivariate statistical model for the archived data segment $S_0$. In contrast, if a data segment $S_2$ contains less archived data than the data segment $S_0$, then the multivariate statistical model for the archived data segment $S_2$ is given less weight than the multivariate statistical model for the archived data segment $S_0$.

The following discussion is provided to assist a reader in further understanding how the CMSM is generated. A CMSM is built as a linear combination of multivariate statistical models developed for each segment. For example, if two data segments $S_1$ and $S_2$ are active for current data, then the MSMs corresponding to the data segments $S_1, S_2$ are $MSM_1$ and $MSM_2$, respectively. In such a scenario, current data can be projected onto $MSM_1$ and $MSM_2$. The $MSM_1$ projection can be defined as $PROJ_1$. Similarly, the $MSM_2$ projection can be defined as $PROJ_2$. The combined projection of current data can be calculated using the following mathematical equation (6).

$$CPROJ = W_1 \cdot PROJ_1 + W_2 PROJ_2 \quad (6)$$

where $W_1$ is a weight for projection $PROJ_1$. $W_2$ is a weight for projection $PROJ_2$. The weights $W_1, W_2$ are proportional to the number of data points contained in respective model. For example, if the data length of each segment $S_0, \ldots, S_K$ is 64 samples and a first segment of the current batch process has a data length of 32 samples at time instant t, then the weight $W_1$ for the first projection is computed as follows: $W_1 = 32/64 = 0.5$. Similarly, if a second segment of the current batch process has a data length 60 samples at time instant t, then the weight $W_1$ for the second projection is computed as follows: $W_1 = 60/64 = 0.9375$. In this scenario, mathematical equation (6) can be re-written as mathematical equation (7).

$$CMSM = \left[\frac{0.5}{(0.5 + 0.9375) \cdot MSM_1}\right] + \left[\frac{0.9375}{(0.5 + 0.9375) \cdot MSM_2}\right] \quad (7)$$
$$= 0.34 \, MSM_1 + 0.64 \, MSM_2$$

The invention is not limited in this regard.

After generating the combined multivariate statistical model, method 500 continues with step 515. In step 515, current data is obtained. The current data includes data that is to be projected onto the single multivariate statistical model identified in step 512 or the combined multivariate statistical model generated in step 514. The current data can also include data collected during the predetermined period of time "t". Upon completing step 515, method continues with step 516 of FIG. 5B.

Referring now to FIG. 5B, step 516 involves performing pre-processing to scale the current data obtained in step 515 of FIG. 5A. The current data can be scaled using any scaling method known to those having ordinary skill in the art. Thereafter, step 518 is performed. In step 518, sets of wavelet coefficient variances ($WCV_0, \ldots, WCV_J$) are determined using the scaled current data. Each set of wavelet coefficient variances represents a time series for a particular variable. The description provide above in relation to step 318 of FIG. 3A and step 402, ..., 424 of FIG. 4 is sufficient for understanding how the sets of wavelet coefficient variances ($WCV_0, \ldots, WCV_J$) are determined in step 518.

After determining the sets of wavelet coefficient variances ($WCV_0, \ldots, WCV_J$), method 500 continues with step 520. In step 520, a feature vector matrix FVM is built for the collected data. The feature vector matrix FVM can be built using the sets of wavelet coefficient variances determined in the previous step 518. The feature vector matrix FVM is built in the same or substantially similar manner as the feature vector matrix FVM built in step 320 of FIG. 3A. As such, the description provided above in relation to step 320 of FIG. 3A is sufficient for understanding how the feature vector matrix is built in step 520.

Subsequent to building the feature vector matrix FVM, step 522 is performed. In step 522, a projection is formed by projecting the feature vectors of the FVM onto the multivariate statistical model identified in step 512 of FIG. 5A or the CMSM generated in step 514 of FIG. 5A. Schematic illustrations of exemplary projections 1100, 1150, 1190 are provided in FIGS. 11A-11C.

In step 524, a Squared Prediction Error (SPE) statistical value Q is computed using projections of feature vectors on PCA dimensions. The SPE statistical value Q indicates how feature vectors compare with those identified under normal operating conditions. Steps for computing an SPE statistical value Q are well known to those having ordinary skill in the art, and therefore will not be described herein. However, it should be understood that the SPE statistical value Q can be defined by the following mathematical equation (8).

$$Q = X_{(NSCALES-NVARIALBLES)} \cdot X^T \tag{8}$$

where $X_{(NSCALES-NVARIALBLES)}$ is a data matrix from a number of observations $N_{SCALES}$ of a number of variables $N_{VARIALBLES}$. $X^T$ is the transpose of the data matrix $X_{(NSCALES-NVARIALBLES)}$.

Notably, the SPE statistical value Q can be computed using information provided by the projection (i.e., the multivariate statistical model having the feature vectors projected thereon). In this regard, it should be understood that a PCA model can be defined by the following mathematical equation (9).

$$X = t_1 p_1^T + t_2 p_2^T + \ldots + t_A p_A^T + E = TP^T + E = \hat{X} + E \tag{9}$$

where X is the feature vector matrix FVM of archived or current data. $t_1, \ldots, t_A$ are scores. $p_1, \ldots, p_A$ are principal directions (or loading vectors) determined using archived data. T is a matrix of principal components scores representing the projection of archived data on a PCA model. P is a matrix of a first A principal components loading. E is a residual part of the feature vector matrix FVM. The principal components define a plane of greatest variability. The loading vectors define the location on the plane via scores. The score is the distance from an origin of the plane along each principal component. The scores are calculated as the product of the loading vectors and observations.

Once current data is obtained, the current data is projected onto the PCA model defined by mathematical equation (9) using the principal directions. In effect, X is the feature vector matrix of current data. As a result of the projection of current data, a new set of score vectors are obtained. The new score vectors can be used to calculate the SPE statistical value Q. The SPE statistical value Q can be defined by the following mathematical equation (10).

$$Q = X(I - PP^T)X^T \tag{10}$$

where I is an identity matrix.

Referring again to FIG. 5B, the method 500 continues with step 526. In step 526, an SPE statistical threshold value $Q_\alpha$ for the data segment(s) identified in the previous step 510 of FIG. 5A is computed. Steps for computing an SPE statistical threshold value $Q_\alpha$ are well known to those having ordinary skill in the art, and therefore will not be described herein. However, it should be understood that the SPE statistical threshold value $Q_\alpha$ can be defined by the following mathematical equation (11).

$$Q_\alpha = (S/2\hat{u}) \cdot X_{2\hat{u}^2/S, \alpha}^2 \tag{11}$$

where S is a covariance matrix. µ is a mean (or average) vector. α is a significance level. $X^2$ is a Chi-square distribution with $2\hat{u}^2/S, \alpha$ at a significance level α.

After completing step 526, step 528 is performed. Step 528 involves predicting whether a normal batch of product will be manufactured during the current run of the batch process. This prediction can involve comparing the SPE statistical value Q computed in step 524 to the SPE statistical threshold value $Q_\alpha$ computed in step 526. If the SPE statistical value Q is less than the SPE statistical threshold value $Q_\alpha$, then the prediction indicates that a normal batch of product will be manufactured during the current run of the batch process. If the SPE statistical value Q is greater than the SPE statistical threshold value $Q_\alpha$, then the prediction indicates that an abnormal batch of product will be manufactured during the current run of the batch process.

Figure 11A:
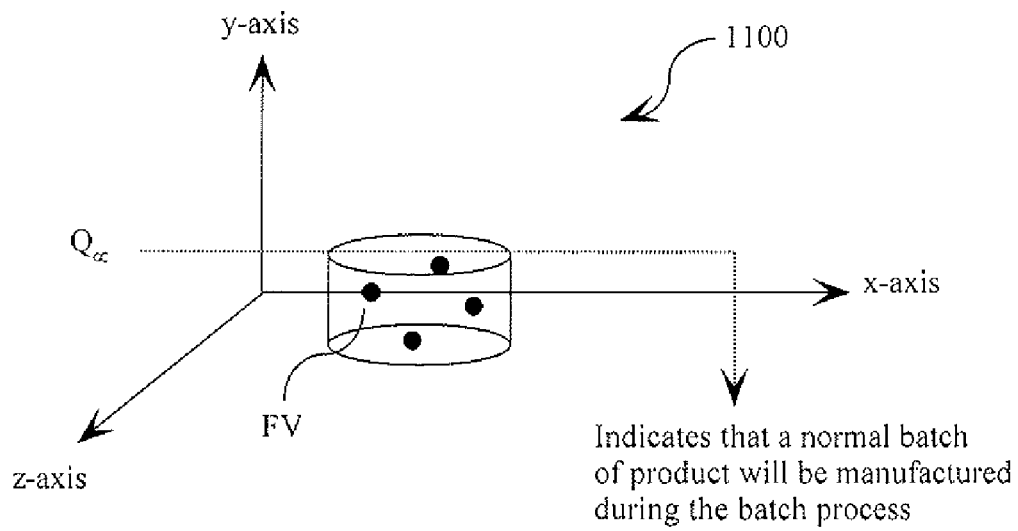
FIG. 11A is a schematic illustration of the multivariate statistical model of FIG. 10 having a feature vector projected thereon.
Figure 11B:
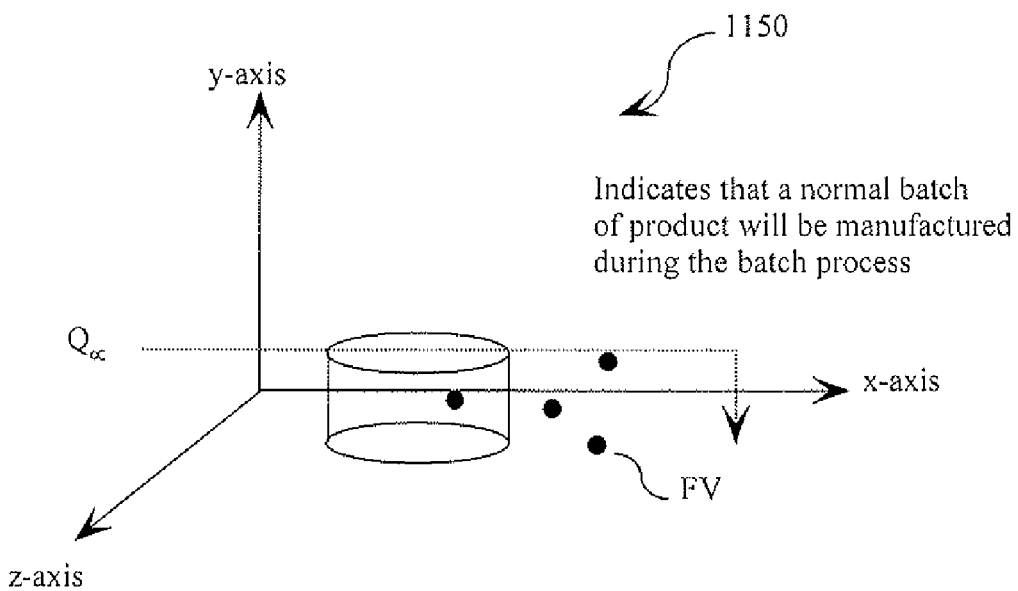
FIG. 11B is a schematic illustration of the multivariate statistical model of FIG. 10 having a feature vector projected thereon.
Figure 11C:
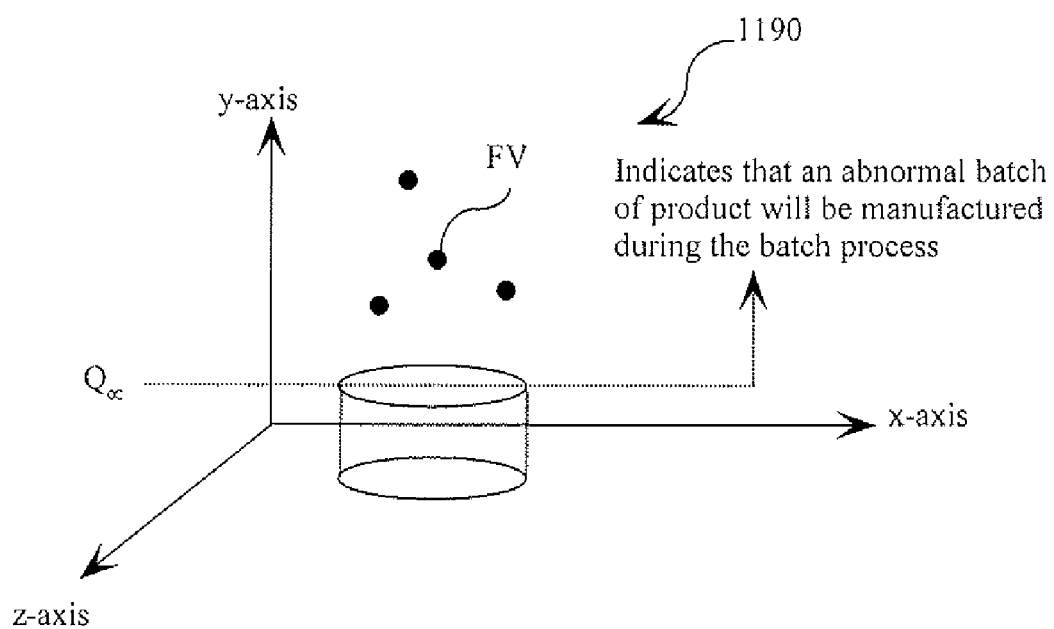
FIG. 11C is a schematic illustration of the multivariate statistical model of FIG. 10 having a feature vector projected thereon.

This prediction can also involve analyzing the projection (i.e., the multivariate statistical model with the feature vectors projected thereon) using the computed SPE statistical threshold value $Q_\alpha$. For example, if the projections of the feature vectors reside at locations within the multivariate statistical model that are below the SPE statistical threshold value $Q_\alpha$ (as shown in FIGS. 11A and 11B), then the prediction indicates that a normal batch of product will be manufactured during the current run of the batch process. In contrast, if the feature vectors reside at locations within the multivariate statistical model that are above the SPE statistical threshold value $Q_\alpha$ (as shown in FIG. 11C), then the prediction indicates that an abnormal batch of product will be manufactured during the current run of the batch process. The batch status will remain in normal state as long as the projections are falling within the cylindrical region.

Thereafter, method 500 continues with a decision step 530. If the prediction indicates that a normal batch of product will be manufactured during the current run of the batch process [530:YES], then step 532 is performed. In step 532, method 500 returns to step 506 of FIG. 5A. If the prediction indicates that an abnormal batch of product will be manufactured during the current run of the batch process [530:NO], then step 534 is performed. Step 534 involves performing actions to prevent an abnormal batch of product from being manufactured. Such actions can include performing remedial measures to restore normalcy to operations of the batch process. This restoration of batch process operations result in the restoration of normalcy to the batch of product, thereby preventing incurable abnormal batch conditions or early termination of a batch of product.

It should be noted that the present invention does not use historical data to forecast future measurements (or variables). The forecasting is usually achieved using the archived normal batch process data, which can bias the batch status predication towards normalcy and increase the false alarm rate. As such, the present invention overcomes certain drawbacks of conventional methods for online monitoring of a batch process. For example, the present invention reliably predicts an evolution of a batch of product. The present invention also flags abnormal operations of a batch process earlier than conventional methods for online monitoring of a batch process. The present invention has a decreased waiting time between successive batch condition assessments. The present invention can be used to continuously predict whether the operations of the batch process are normal. This continuous predictability feature of the present invention is a result of combining multivariate statistical models for overlapping archived data segments and using the combined multivariate statistical model to predict the health of a batch of product.

Figure 12:
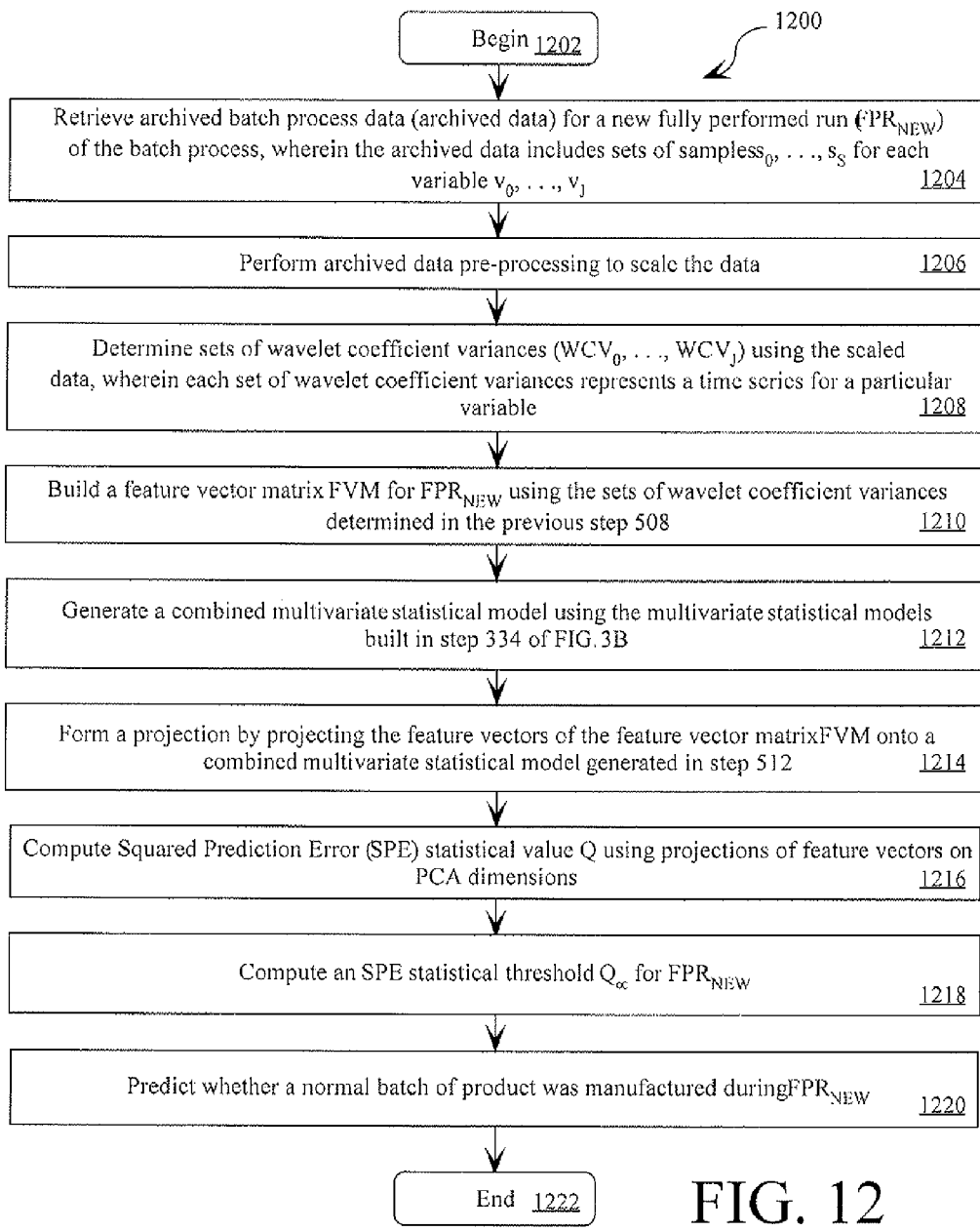
FIG. 12 is a flow diagram of a method for performing an offline monitoring of a batch process using multivariate statistical models according to an embodiment of the invention.

Referring to FIG. 12, there is provided a flow diagram of a method 1200 for performing offline monitoring of batch processes. As shown in FIG. 12, method 1200 begins with step 1202 and continues with step 1204. In step 1204, archived batch process data (or archived data) is retrieved for a new fully performed run $FPR_{NEW}$ of a batch process. The archived data includes, but is not limited to, sets of samples $s_0, \ldots, s_S$ for each variable $v_0, \ldots, v_J$. Subsequent to completing step 1204, step 1206 is performed where the archived data is pre-processed to scale the same. Thereafter, method 1200 continues with step 1208.

In step 1208, sets of wavelet coefficient variances $WCV_0, \ldots, WCV_J$ are determined using the scaled data. Each set of wavelet coefficient variance represents a time series for a particular variable. After determining the sets of wavelet coefficient variances $WCV_0, \ldots, WCV_J$, step 1210 is performed. In step 1210, a feature vector matrix FVM for $FPR_{NEW}$ is built using the sets of wavelet coefficient variances $WCV_0, \ldots, WCV_J$. In step 1212, a combined multivariate statistical model is generated using the multivariate statistical models built in step 334 of FIG. 3B.

Upon completing step 1212, method 1200 continues with steps 1214, 1216, and 1218. In step 1214, a projection is formed by projecting feature vectors of the feature vector matrix FVM onto the combined multivariate statistical model. Step 1216 involves computing a Squared Prediction Error (SPE) statistical value Q. The SPE statistical value Q can be computed using projections of features vectors on PCA dimensions. Step 1218 involves computing an SPE statistical threshold $Q_\alpha$ for $FPR_{NEW}$.

Subsequent to completing steps 1214-1218, method 1200 continues with step 1220. Step 1220 involves predicting whether a normal batch of product was manufactured during $FPR_{NEW}$. This prediction can involve comparing the SPE statistical value Q computed in step 1216 to the SPE statistical threshold value $Q_\alpha$ computed in step 1218. If the SPE statistical value Q is less than the SPE statistical threshold value $Q_\alpha$, then the prediction indicates that a normal batch of product was manufactured during $FPR_{NEW}$. If the SPE statistical value Q is greater than the SPE statistical threshold value $Q_\alpha$, then the prediction indicates that an abnormal batch of product was manufactured during $FPR_{NEW}$. Thereafter, step 1222 is performed where method 1200 ends.

In light of the forgoing description of the invention, it should be recognized that the present invention can be realized in hardware, software, or a combination of hardware and software. A method for decoding an encoded sequence according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for online monitoring of batch processes, comprising the steps of:
    building a plurality of multivariate statistical models (MSMs) using archived batch process data (ABPD) for a batch process comprising stored batch process data (BPD) for at least one batch process parameter (BPP) obtained during a plurality of different times during a duration of a plurality of runs of said batch process;
    initiating a current run of said batch process;
    collecting current batch process data (CBPD) for at least said BPP during said plurality of different times up to a current time for said current run that is less than a duration for said current run;
    and using a processor for:
    (i) building a feature vector matrix using said CBPD, said feature vector matrix comprising a plurality of feature vectors representing statistical measures of wavelet coefficients determined at said plurality of different times up to said current time for a plurality of variables;
    (ii) forming a projection by projecting said plurality of feature vectors onto at least one MSM of said plurality of MSMs or a combined multivariate statistical model (CMSM); and
    (iii) generating at least one estimated value for said BPP at a time after said current time during a duration of said current run using information provided by said projection.

2. The method according to claim 1, wherein said step of building a plurality of MSMs further comprises dividing said ABPD into a plurality of data segments corresponding to said BPP at said plurality of different times, said plurality of data segments being overlapping data segments.

3. The method according to claim 2, wherein said step of building a plurality of MSMs further comprises building said plurality of MSMs using said plurality of data segments, each MSM of said plurality of MSMs corresponding to a particular data segment of said plurality of data segments.

4. The method according to claim 2, further comprising the step of identifying at least one data segment of said plurality of data segments that corresponds to said CBPD.

5. The method according to claim 4, further comprising the step of computing a Squared Prediction Error (SPE) statistical value Q for said feature vector matrix using said information provided by said projection.

6. The method according to claim 5, further comprising the step of computing an SPE statistical threshold $Q\alpha$ for said at least one data segment that corresponds to said CBPD.

7. The method according to claim 6, wherein said step of generating at least one estimated value further comprises determining if said SPE statistical value Q is less than said SPE statistical threshold $Q\alpha$.

8. The method according to claim 7, further comprising the step of taking at least one remedial measure involving correction of operation of said batch process during said duration for said current run if it is determined that said SPE statistical value Q is greater than said SPE statistical threshold $Q\alpha$.

9. The method according to claim 4, further comprising the step of identifying at least two MSMs of said plurality of MSMs that corresponds to said at least one data segment that corresponds to said CBPD.

10. The method according to claim 9, further comprising the step of generating said CMSM by determining a weighted average of said at least two MSMs corresponding to said at least one data segment.

11. The method according to claim 1, further comprising the step of scaling said ABPD prior to building said plurality of MSMs.

12. The method according to claim 1, further comprising the step of unfolding said ABPD expressed as a three way array of ABPD into a two way array of ABPD prior to building said plurality of MSMs.

13. A batch processing system configured for online monitoring of batch processes, comprising:
a statistical model building device configured for building a plurality of multivariate statistical models (MSMs) using archived batch process data (ABPD) for a batch process comprising stored batch process data (BPD) for at least one batch process parameter (BPP) obtained during a plurality of different times during a duration of a plurality runs of said batch process;
a data collection device configured for collecting current batch process data (CBPD) for at least said BPP during said plurality of different times up to a current time for a current run of said batch process, said interval of time being less than a duration for said current run;
an estimating device configured for building a feature vector matrix comprising a plurality of feature vectors representing statistical measures of wavelet coefficients determined at said plurality of different times up to said current time for a plurality of variables, forming a projection by projecting said feature vectors onto at least one MSM of said plurality of MSMs or a combined multivariate statistical model (CMSM), and generating at least one estimated value for said BPP at a time after said current time during a duration of said current run using information provided by said projection, said feature vector matrix built using said CBPD.

14. The batch processing system according to claim 13, wherein said statistical model building device is further configured for dividing said ABPD into a plurality of data segments corresponding to said BPP at said plurality of different times, said plurality of data segments being overlapping data segments.

15. The batch processing system according to claim 14, wherein said statistical model building device is further configured for building said plurality of MSMs using said plurality of data segments, each MSM of said plurality of MSMs corresponding to a particular data segment of said plurality of data segments.

16. The batch processing system according to claim 14, wherein said estimating device is further configured for identifying at least one data segment of said plurality of data segments that corresponds to said CBPD.

17. The batch processing system according to claim 16, wherein said estimating device is further configured for computing a Squared Prediction Error (SPE) statistical value Q for said feature vector matrix using said information provided by said projection.

18. The batch processing system according to claim 17, wherein said estimating device is further configured for computing an SPE statistical threshold $Q\alpha$ for said at least one data segment that corresponds to said CBPD.

19. The batch processing system according to claim 18, wherein said estimating device is further configured for determining if said SPE statistical value Q is less than said SPE statistical threshold $Q\alpha$.

20. The batch processing system according to claim 19, wherein said estimating device is further configured for communicating with a control system so that at least one remedial measure involving correction of operation of said batch process during said duration for said current run is taken if it is determined that said SPE statistical value Q is greater than said SPE statistical threshold $Q\alpha$.

21. The batch processing system according to claim 13, wherein said estimating device is further configured for identifying at least two MSMs of said plurality of MSMs that corresponds to said at least one data segment that corresponds to said CBPD.

22. The batch processing system according to claim 21, wherein said estimating device is further configured for generating said CMSM by determining a weighted average of said at least two MSMs corresponding to said at least one data segment.

23. The batch processing system according to claim 13, wherein said ABPD is scaled and unfolded from a three way array of ABPD into a two way array of ABPD prior to said plurality of MSMs being built.

24. The batch processing system according to claim 13, wherein said CBPD is scaled prior to said feature vector matrix being built.

* * * * *